United States Patent
Kurishige et al.

(10) Patent No.: US 6,490,514 B2
(45) Date of Patent: *Dec. 3, 2002

(54) ELECTRIC POWER STEERING CONTROL SYSTEM AND METHOD FOR CONTROLLING ELECTRIC POWER STEERING CONTROL SYSTEM

(75) Inventors: Masahiko Kurishige, Tokyo (JP); Noriyuki Inoue, Tokyo (JP); Toshihide Satake, Tokyo (JP); Takayuki Kifuku, Tokyo (JP); Shunichi Wada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/773,386

(22) Filed: Feb. 1, 2001

(65) Prior Publication Data

US 2001/0023382 A1 Sep. 20, 2001

(51) Int. Cl.[7] ................................................. B62D 6/00
(52) U.S. Cl. ........................... 701/41; 180/443; 318/432
(58) Field of Search ..................... 701/41, 42; 180/443, 180/404, 446, 402, 412, 413; 318/432

(56) References Cited

U.S. PATENT DOCUMENTS

| 4,664,211 A | * | 5/1987 | Oshita et al. ............... 180/142 |
| 4,681,183 A | * | 7/1987 | Oshita ........................ 180/79.1 |
| 4,753,308 A | * | 6/1988 | Noto et al. ................. 180/79.1 |
| 4,800,975 A | * | 1/1989 | Oshita et al. ............... 180/142 |
| 4,837,692 A | * | 6/1989 | Shimizu ................. 364/424.05 |
| 4,875,541 A | * | 10/1989 | Oshita et al. .............. 180/79.1 |
| 4,972,133 A | * | 11/1990 | Hirota et al. ................ 318/646 |
| 4,979,114 A | * | 12/1990 | Oshita et al. .......... 364/424.05 |
| 5,097,918 A | * | 3/1992 | Daido et al. ................ 180/79.1 |
| 5,201,818 A | * | 4/1993 | Nishimot .................... 180/79.1 |
| 5,253,725 A | * | 10/1993 | Nishimoto ................. 180/79.1 |
| 5,257,828 A | | 11/1993 | Miller et al. |
| 5,473,539 A | * | 12/1995 | Shimizu et al. ............. 180/446 |
| 5,596,252 A | * | 1/1997 | Shimizu et al. ............. 318/432 |
| 5,668,722 A | * | 9/1997 | Kaufmann et al. ............ 701/41 |
| 5,719,766 A | * | 2/1998 | Bolourchi et al. ...... 364/424.05 |
| 5,740,040 A | | 4/1998 | Kifuku et al. .......... 364/24.051 |
| 5,828,973 A | * | 10/1998 | Takeuchi et al. ............... 701/41 |
| 5,881,836 A | * | 3/1999 | Nishimoto et al. ......... 180/446 |
| 6,131,693 A | * | 10/2000 | Mukai et al. ................ 180/446 |
| 6,161,068 A | * | 12/2000 | Kurishige et al. ............ 701/41 |
| 6,259,980 B1 | * | 7/2001 | Hirota et al. .................. 701/24 |

FOREIGN PATENT DOCUMENTS

| EP | 0 718 174 A | 6/1996 |
| EP | 0 900 710 A | 2/2001 |
| EP | 1 077 171 E | 2/2001 |
| EP | 1 077 171 D | 2/2001 |
| JP | 7-186994 | 7/1995 |

\* cited by examiner

*Primary Examiner*—William A. Cuchlinski, Jr.
*Assistant Examiner*—Olga Hernandez
(74) *Attorney, Agent, or Firm*—Leydig, Voit & Mayer, Ltd.

(57) ABSTRACT

A power steering control system is provided with a road surface reaction torque detector in which a motor inertia torque is subtracted from a value obtained by adding steering torque and motor torque, and the value is passed through two stages of primary filters to obtain a road surface reaction torque. In such a computation, the inertia term of the steering wheel manipulation force does not depend on frequency and high frequency components do not bring about any unusually large steering wheel return force. Therefore, a driver can drive without difficulty in adapting to the power steering.

10 Claims, 12 Drawing Sheets

ELECTRIC POWER STEERING CONTROL SYSTEM AND METHOD FOR CONTROLLING ELECTRIC POWER STEERING CONTROL SYSTEM

BACKGROUND OF THE INVENTION

1. Technical Field

The present invention relates to an improvement in an electric power steering control system in which an electric motor generates torque for assisting steering torque generated by driver's steering wheel manipulation.

2. Background Art

A power steering control system is used as a system in which driving force of another power source (such as a hydraulic pump or an electric motor) assists driver's steering wheel manipulation to reduce driver's force necessary for manipulation of the steering wheel and facilitate manipulation of the steering wheel. In the following description, a system in which an electric motor is used as the foregoing another power source is referred to as an electric power steering control system in order to distinguish the system from other systems.

An example of an electric power steering control system, FIG. 10 shows a construction of a system described in Japanese Patent Application No. 016026/2000 previously filed by the applicant. In the drawing, reference numeral 10 is an electric motor (hereinafter simply referred to as motor) for driving the steering system (not shown). Numeral 1 is a steering torque detector (which is referred to as steering torque detecting means) for detecting a steering torque generated by driver's steering wheel manipulation (not shown) and outputs a steering torque signal. Numeral 2 is a steering torque controller (which is referred to as steering assist controlling means) for computing a steering assist torque signal on the basis of the steering torque signal. Numeral 17 is a return torque compensator which outputs a steering wheel return assist torque signal for generating a torque of the motor 10 in the direction of returning the steering wheel to a starting point on the basis of a road surface reaction torque signal which is an output of a road surface reaction torque detector 15. Numeral 5 is a motor speed detector, numeral 3 is a damping compensator which receives a motor speed signal and compensates its damping, numeral 4 is an inertia compensator, numeral 6 is a motor acceleration detector, numeral 7 is a motor current determiner, numeral 9 is a motor drive, numeral 11 is a motor current detector, numeral 12 is a first adder, numeral 13 is a second adder, and numeral 14 is a speed detector.

Numeral 15S is a road surface reaction torque detector provided with a low-pass filter. The road surface reaction torque detector 15S computes a road surface reaction torque signal on a S/W of a microcomputer on the basis of a steering torque signal which is an output of the steering torque detector 1, a motor acceleration signal which is an output of the motor acceleration detector 6, and a motor current value outputted by the motor current detector 11. Then, the road surface reaction torque detector 15S outputs the road surface reaction torque signal. FIG. 12 shows a diagram for explaining the processing operation of the road surface reaction torque detector 15S in the computation, and the computation is described later in detail.

Operation of the electric power steering control system of FIG. 12 is described below with reference to a flowchart of FIG. 11.

First, in Step S301, a steering torque signal detected by the steering torque detector 1 is read and stored in a memory.

Next, in Step S302, a motor speed signal detected by the motor speed detector 5 is read and stored in the memory. In Step S303, the motor acceleration detector 6 differentiates the motor speed signal, and a motor acceleration signal is obtained and stored in the memory. In Step S304, a motor current signal is read and stored in the memory.

Then, in Steps S305 to S306, the following computation is conducted in the road surface reaction torque detector 15S, and a road surface reaction torque signal is obtained.

First, in Step S305, a stationary reaction force signal T'rea-est is obtained from the fogoing Equation (1) using a steering torque signal Tsens, a motor acceleration signal dω equivalent to a rotational acceleration of the steering shaft, and a motor current signal Imtr.

$$T'rea\text{-}est = Tsens + Kt \cdot Imtr - J \cdot d\omega \tag{1}$$

where:
Kt: torque constant of the motor (computed in terms of steering shaft)
J: moment of inertia of the steering mechanism Next, in Step 306, the low-pass filter arranged in the road surface reaction torque detector 15S conducts a primary filter computation as shown in the following Equation (2) to obtain a road surface reaction torque signal Trea-est, and this road surface reaction torque signal Trea-est is stored in the memory.

$$dTrea\text{-}est/dt = -Trea\text{-}est/T1 + T'rea\text{-}est/T1 \tag{2}$$

where: T1 is a time constant of a primary filter in Equation (2), and is established so that a cutoff frequency $fc = 1/(2\pi \cdot T1)$ may be in the range of 0.05 Hz to 1.0 Hz.

Next, in Steps S307 to S308, in the steering torque controller 2, the steering torque signal is passed through a phase compensator and phase-compensated, mapping operation is conducted with respect to the phase-compensated steering torque signal, and a steering assist torque signal is obtained and stored in the memory.

In Step S309, in the return torque compensator 17, mapping operation is conducted for the foregoing road surface reaction torque signal Trea-est, and a steering wheel return assist torque signal is obtained and stored in the memory.

In Step S310, in the damping compensator 3, a damping compensation signal is obtained by multiplying the motor speed signal and the proportional gain and the product is stored in the memory.

In Step S311, in the inertia compensator 4, an inertia compensation signal is obtained by multiplying the motor acceleration signal and the proportional gain and is stored in the memory.

Next, advancing to Step S312, the first adder 12 adds the steering assist torque signal, steering wheel return assist torque signal, damping compensation signal, and inertia compensation signal obtained in the foregoing Steps S308 to S311, thus a target torque is obtained and stored in the memory.

In Step S313, in the motor current determiner 7, a target current is obtained by multiplying the target torque obtained in the foregoing step S312 by a gain, and the target current is stored in the memory. The gain obtained at this time is an inverse (reciprocal) of the torque constant of the motor 10 computed in terms of steering shaft.

The foregoing Steps S301 to S313 are repeated.

Described below is the reason why it is possible to detect the road surface reaction torque from the foregoing Equation (1) and Equation (2).

The equation of motion of the steering mechanism is expressed by the following Equation (3).

$$J \cdot d\omega s/dt = Thdl + Tmtr - Tfric - Treact \quad (3)$$

where:

- $d\omega s/dt$: rotational acceleration of the steering shaft
- Thdl: steering torque
- Tmtr: motor output torque (computed in terms of steering shaft)
- Tfric: friction torque in the steering mechanism
- Treact: road surface reaction torque (computed in terms of steering shaft)

When solving the foregoing Equation (3) for the road surface reaction torque Treact, the following Equation (4) is obtained.

$$Treact = Thdl + Tmtr - J \cdot d\omega s/dt - Tfric \quad (4)$$

Accordingly, the road surface reaction torque Treact is obtained by using the respective values of the steering torque, motor output torque, rotational acceleration of the steering shaft, and friction torque in the steering mechanism. In this respect, it is possible to use the steering torque signal Tsens as the steering torque Thdl, and it is possible to use a value obtained by multiplying the motor current signal Imtr by the torque constant Kt as the motor output torque Tmtr. It is also possible to use the motor acceleration signal $d\omega$ as the rotational acceleration of the steering shaft ($d\omega s/dt$). After all, it becomes possible to detect the road surface reaction torque excluding influence of the friction torque Tfric in the steering mechanism from the foregoing Equation (1).

On the other hand, the friction torque Tfric acts as a relay on the speed of revolution of the steering mechanism. It is well known that the relay can be equivalently expressed in the form of gain and phase by equivalent linearization method in the field of control engineering. Accordingly, when the gain and phase of the stationary reaction force signal T'rea-est detected in the foregoing Equation (1) are regulated by the primary filter in the foregoing Equation (2), the road surface reaction torque signal T'rea-est is obtained.

That is to say, the primary filter (low-pass filter) is used as the most popular method for regulating the gain and phase as shown in FIG. 12. The range in which the gain and phase can be regulated by the primary filter is a frequency range not lower than the cutoff frequency. When establishing the cutoff frequency in the range of 0.5 to 1 times the frequency to be regulated, the gain can be regulated within the range of approximately 1 to 0.5 times and the phase can be regulated within the range of 0 to 20 deg. Thus, the influence of the friction torque can be cancelled in most cases. The steering frequency generally used in vehicles is in the range of approximately 0.1 to 1 Hz. That is, when establishing the cutoff frequency in the range of 0.5 to 1 times the foregoing steering frequency, i.e., approximately 0.05 Hz to 1 Hz, it is possible to cancel the influence of the friction torque. In addition, the specific cutoff frequency is established aiming toward a steering frequency, on which control based on the detected road surface reaction torque signal is desired, that works most effectively.

As described above, in the power steering system of FIG. 12, the influence of the term ($J \cdot d\omega s/dt$) which is equivalent to the inertia of the motor, increases in proportion to square of the frequency, while the primary filter is used as the low-pass filter of the road surface reaction torque detector. As a result, the influence of the inertia of the motor increases in proportion to the frequency components of the force of manipulating the steering wheel as shown in the following Equation (5):

$$J \cdot f^2 / (T1 \cdot f + 1) \approx J \cdot f / T1 \quad (5)$$

Therefore, an error in the term which is equivalent to the inertia of the motor due to detection error of the rotational acceleration of the steering shaft ($d\omega s/dt$) or estimation error of the moment of inertia (J) of the steering mechanism increases in proportion to the steering wheel manipulation. As a result, a problem exists in that when manipulating the steering wheel in a quick cycle which includes a lot of high frequency components (hereinafter referred to as high frequency steering), the motor generates unnatural steering wheel return torque and the steering wheel becomes unusually heavy.

SUMMARY OF THE INVENTION

The present invention was made to resolve the above-discussed problems and has an object of providing a power steering system in which any unnatural steering wheel return torque is not generated and the steering wheel does not become unusually heavy even when conducting a steering wheel manipulation under high-frequency.

An electric power steering control system according to the invention comprises:

- an electric motor which generates a torque for assisting a steering torque generated by driver's steering wheel manipulation;
- steering torque detecting means for detecting the steering torque;
- motor current detecting means for detecting a current flowing in the motor; and
- first road surface reaction torque means for obtaining a road surface reaction torque detection value by passing a value obtained by adding the steering torque and a motor torque computed in terms of steering shaft from the motor current through filters formed by plural stages of primary low-pass filters connected in series.

As a result of such construction, even when conducting a steering wheel manipulation containing high frequency components, any unusually large steering wheel return torque is not generated. Thus, it is possible to achieve a power steering control system by which a driver can drive his vehicle without feeling something like difficulty in adapting himself to the power steering.

Another electric power steering control system according to the invention comprises:

- an electric motor which generates a torque for assisting a steering torque;
- steering torque detecting means for detecting the steering torque;
- motor current detecting means for detecting a current flowing in the motor;
- rotational acceleration detecting means for detecting a rotational acceleration of the electric motor; and
- second road surface reaction torque detecting means for obtaining a road surface reaction torque detection value by passing a value obtained by subtracting a motor inertia torque computed in terms of steering shaft from an output of the rotational acceleration detecting means from a value obtained by adding the steering torque and a motor torque computed in terms of steering shaft from the motor current through filters formed by plural stages of primary low-pass filters connected in series.

As a result of such construction, even when conducting a steering wheel manipulation containing high frequency components, any unusually large steering wheel return torque is not generated. Thus, it is possible to achieve a power steering control system by which a driver can drive his vehicle without feeling something like difficulty in adapting himself to the power steering.

It is preferable that the electric power steering control system is provided with a limiter for limiting the value obtained by subtracting the motor inertia torque computed in terms of steering shaft from an output of the rotational acceleration detecting means from the value obtained by adding the steering torque and a motor torque computed in terms of steering shaft from the motor current not to exceed a predetermined value.

As a result of such construction, even when conducting a steering wheel manipulation containing high frequency components, any unusually large steering wheel return torque is not generated. Thus, it is possible to achieve a power steering control system by which a driver can drive his vehicle without feeling something like difficulty in adapting himself to the power steering.

It is preferable that the plural stages of primary low-pass filters include at least one filter whose time constant is not less than 0.05 Hz and not more than 1 Hz and at least one filter whose time constant is not less than 1 Hz and not more than 3 Hz.

As a result, the driver can drive without feeling something like difficulty in adapting himself to the power steering.

A further electric power steering control system according to the invention comprises:
- an electric motor which generates a torque for assisting a steering torque;
- steering torque detecting means for detecting the steering torque;
- motor current detecting means for detecting a current flowing in the motor;
- a limiter for limiting the value obtained by adding the steering torque and a motor torque computed in terms of steering shaft from the motor current not to exceed a predetermined value; and
- third road surface torque detecting means for obtaining a road surface reaction torque value by passing the mentioned value through a low-pass filter.

As a result of such construction, even when conducting a steering wheel manipulation containing high frequency components, any unusually large steering wheel return torque is not generated. Thus, it is possible to achieve a power steering control system by which a driver can drive his vehicle without feeling something like difficulty in adapting himself to the power steering.

A still further electric power steering control system according to the invention comprises:
- an electric motor which generates a torque for assisting a steering torque;
- steering torque detecting means for detecting the steering torque;
- motor current detecting means for detecting a current flowing in the motor;
- rotational acceleration detecting means for detecting a rotational acceleration of the electric motor;
- a limiter for limiting a value obtained by subtracting a motor inertia torque computed in terms of steering shaft from the rotational acceleration from a value obtained by adding the steering torque and a motor torque of the electric motor computed in terms of steering shaft from the motor current not to exceed a predetermined value; and
- fourth road surface reaction torque detecting means for obtaining a road surface reaction torque detection value by passing the mentioned value through a low-pass filter.

As a result of such construction, even when conducting a steering wheel manipulation containing high frequency components, any unusually large steering wheel return torque is not generated. Thus, it is possible to achieve a power steering control system by which a driver can drive his vehicle without feeling something like difficulty in adapting himself to the power steering.

A method for controlling an electric power steering control system according to the invention comprises the steps of:
- detecting a steering torque generated by steering wheel manipulation;
- detecting a current of an electric motor which generates a torque for assisting the steering torque;
- detecting a rotational acceleration of the electric motor; and
- detecting a road surface reaction torque for obtaining a road surface reaction torque detection value by passing a value obtained by subtracting a motor inertia torque computed in terms of steering shaft from the rotational acceleration from a value obtained by adding the steering torque and a motor torque computed in terms of steering shaft from the motor current through primary low-pass filters formed by plural stages of primary low-pass filters connected in series.

As a result of such control method, even when conducting a steering wheel manipulation containing high frequency components, any unusually large steering wheel return torque is not generated. Thus, it is possible to achieve a power steering control system by which a driver can drive his vehicle without feeling something like difficulty in adapting himself to the power steering.

Another method for controlling an electric power steering control system according to the invention comprises the steps of:
- detecting a steering torque generated by steering wheel manipulation;
- detecting a current of an electric motor which generates a torque for assisting the steering torque;
- detecting a rotational acceleration of the electric motor;
- limiting a value obtained by subtracting a motor inertia torque computed in terms of steering shaft from the rotational acceleration from a value obtained by adding the steering torque and a motor torque computed in terms of steering shaft from the motor current not to exceed a predetermined value; and
- detecting a road surface reaction torque for obtaining a road surface reaction torque detection value by passing the mentioned value through a low-pass filter.

As a result of such control method, even when conducting a steering wheel manipulation containing high frequency components, any unusually large steering wheel return torque is not generated. Thus, it is possible to achieve a power steering control system by which a driver can drive his vehicle without feeling something like difficulty in adapting himself to the power steering.

It is also preferable that the electric power steering control system is provided with a limiter for limiting the value obtained by adding the steering torque and the motor torque computed in terms of steering shaft from the motor current not to exceed a predetermined value.

As a result of such construction, even when conducting a steering wheel manipulation containing high frequency components, any unusually large steering wheel return torque is not generated. Thus, it is possible to achieve a power steering control system by which a driver can drive his vehicle without feeling something like difficulty in adapting himself to the power steering.

DESCRIPTION OF THE PREFERRED EMBODIMENTS

Embodiment 1

Figure 1:
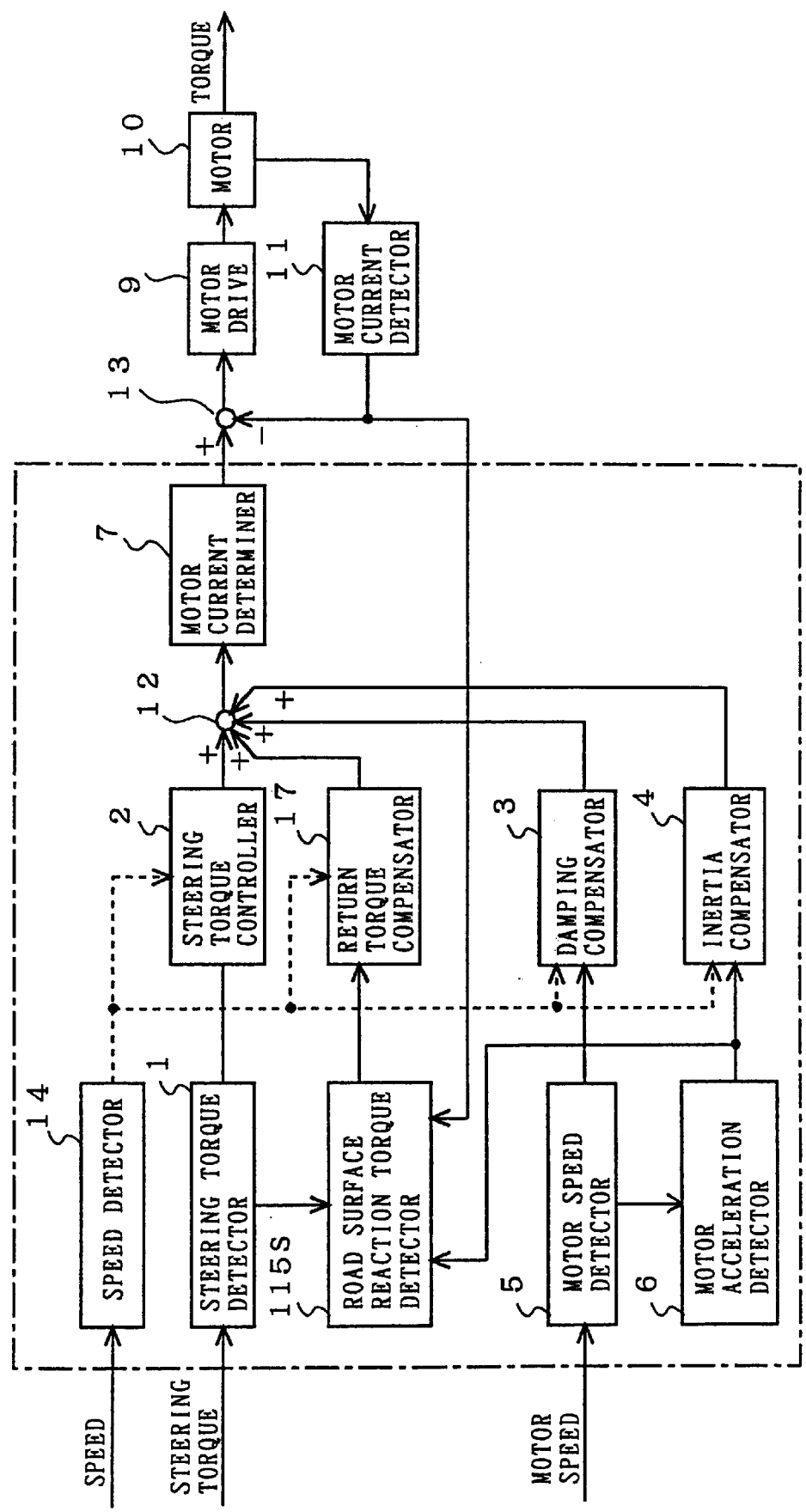
FIG. 1 is a block diagram showing an electric power steering control system according to Embodiment 1 of the invention.
Figure 2:
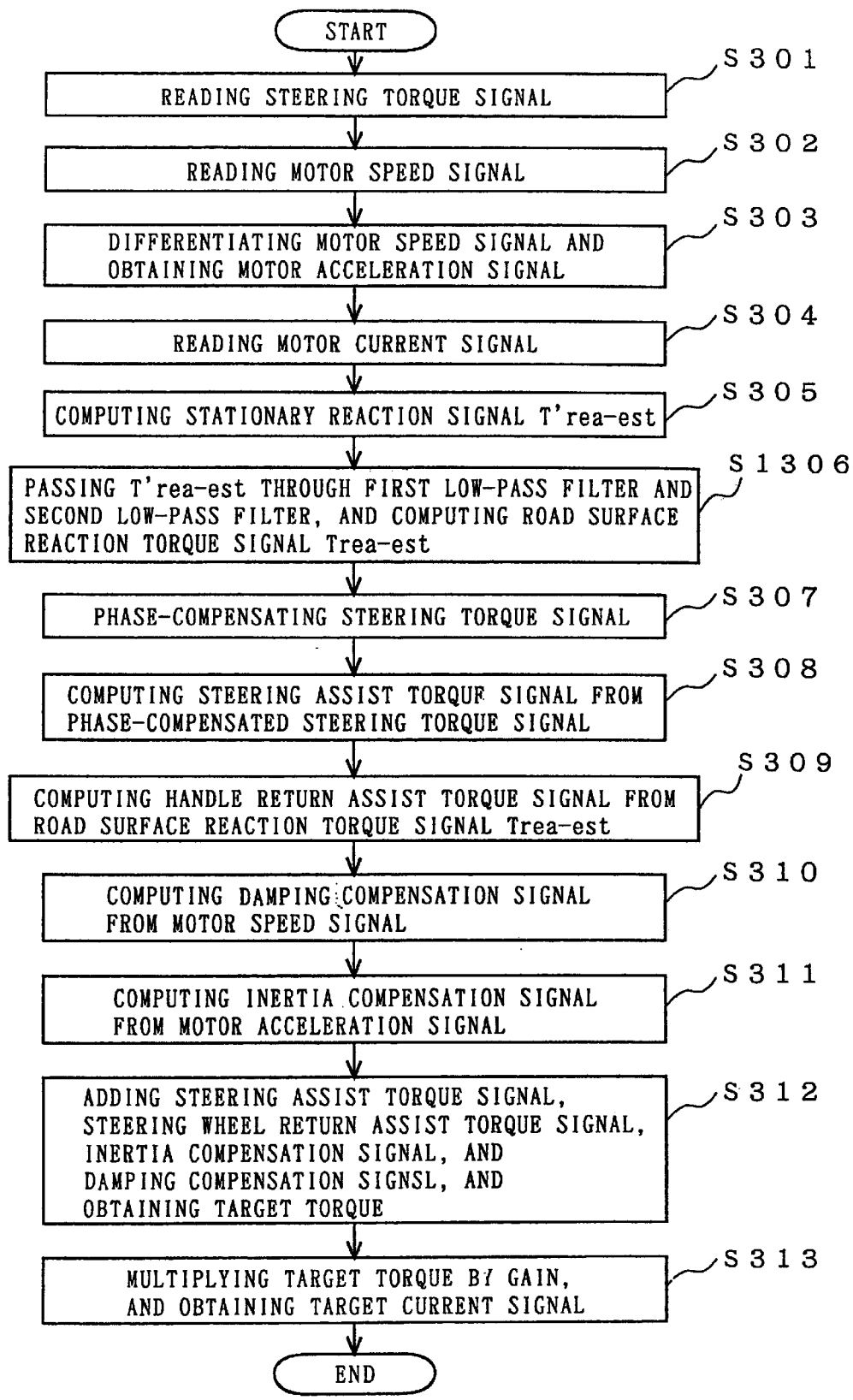
FIG. 2 is a flowchart showing the operation of a road surface reaction torque detector shown in the block diagram of FIG. 1.

FIG. 1 is a block diagram showing an electric power steering control system according to Embodiment 1 of the invention. FIG. 2 is a flowchart showing the operation of a road surface reaction torque detector shown in the block diagram of FIG. 1.

Figure 3:
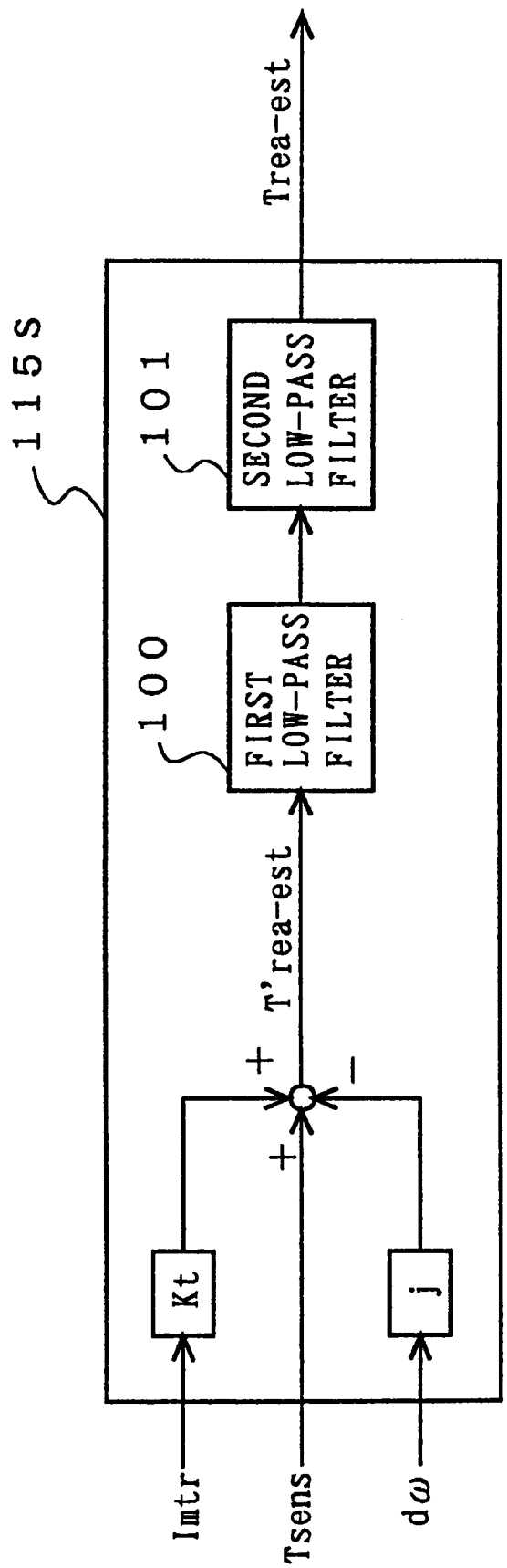
FIG. 3 is a block diagram to explain the computing operation of the road surface reaction torque detector shown in the block diagram of FIG. 1.

Referring to FIG. 1, reference numeral 10 is an electric motor (hereinafter simply referred to as motor) for driving the steering system not shown. Numeral 1 is a steering torque detector (which is referred to as steering torque detecting means) for detecting a steering torque generated by driver's steering wheel manipulation not shown and outputs a steering torque signal. Numeral 2 is a steering torque controller for computing a steering assist torque signal on the basis of the steering torque signal. Numeral 17 is a return torque compensator which outputs a steering wheel return assist torque signal for generating a torque of the motor 10 in the direction of returning the steering wheel to a starting point on the basis of a later-described road surface reaction torque signal which is an output of a road surface reaction torque detector 15. Numeral 5 is a motor speed detector, numeral 3 is a damping compensator which receives a motor speed signal and compensates its damping, numeral 4 is an inertia compensator, numeral 6 is a motor acceleration detector (motor acceleration detecting means), numeral 7 is a motor current determiner, numeral 9 is a motor drive, numeral 11 is a motor current detector (motor current detecting means), numeral 12 is a first adder, numeral 13 is a second adder, and numeral 14 is a speed detector. Numeral 115S is a second road surface reaction torque detector (second means for detecting road surface reaction torque), and an explanatory diagram of its processing operation is shown in FIG. 3.

Figure 11:
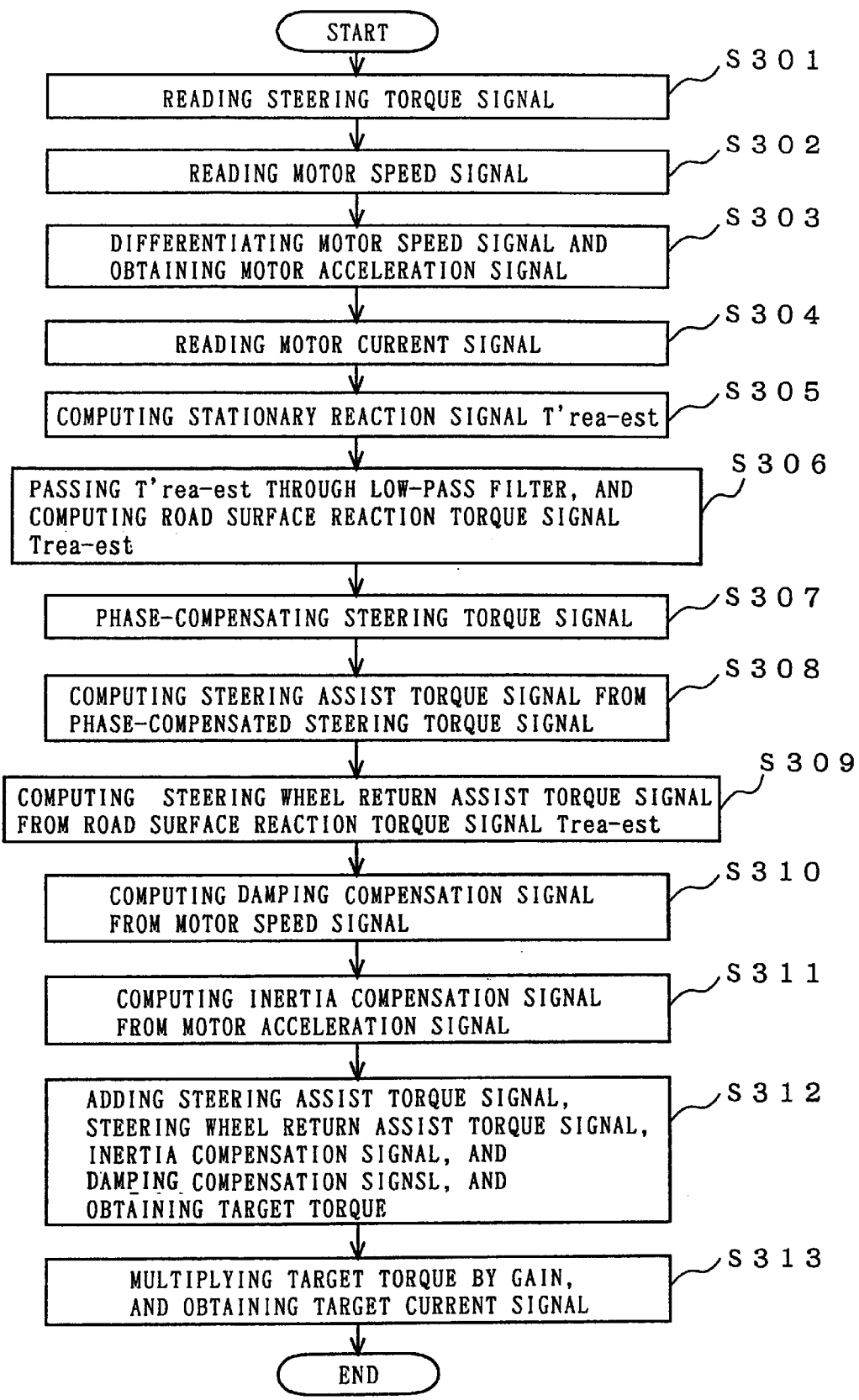
FIG. 11 is a flowchart showing the operation of a road surface reaction torque detector shown in the block diagram of FIG. 10.

When comparing FIG. 2 with the flowchart FIG. 11, only Step S1306 is different, and the other steps are the same as those in FIG. 11. In this Step S1306, the road surface reaction torque signal Trea-est is computed by passing T'rea-est through low-pass filters, and the low-pass filters are formed of a first primary low-pass filter 100 and a second primary low-pass filter 101 connected in series as shown in FIG. 3.

The first primary low-pass filter 100 is as shown in Equation (6), and in the same manner as the system described above with respect to FIG. 12, a time constant T1 is established so that a cutoff frequency fc=1/(2π·T1) may be in the range of 0.05 Hz to 1.0 Hz.

$$dT''rea\text{-}est/dt = -T''rea\text{-}est/T1 + T'rea\text{-}est/T1 \qquad (6)$$

where: T''rea-est is a quantity in intermediate state.

On the other hand, the second primary low-pass filter 101 is as shown in Equation (7), and a time constant T2 is established so that a cutoff frequency fc=1/(2π·T2) may be in the range of 1.0 Hz to 3.0 Hz.

$$dTrea\text{-}est/dt = -Trea\text{-}est/T2 + T''rea\text{-}est/T2 \qquad (7)$$

Figure 12:
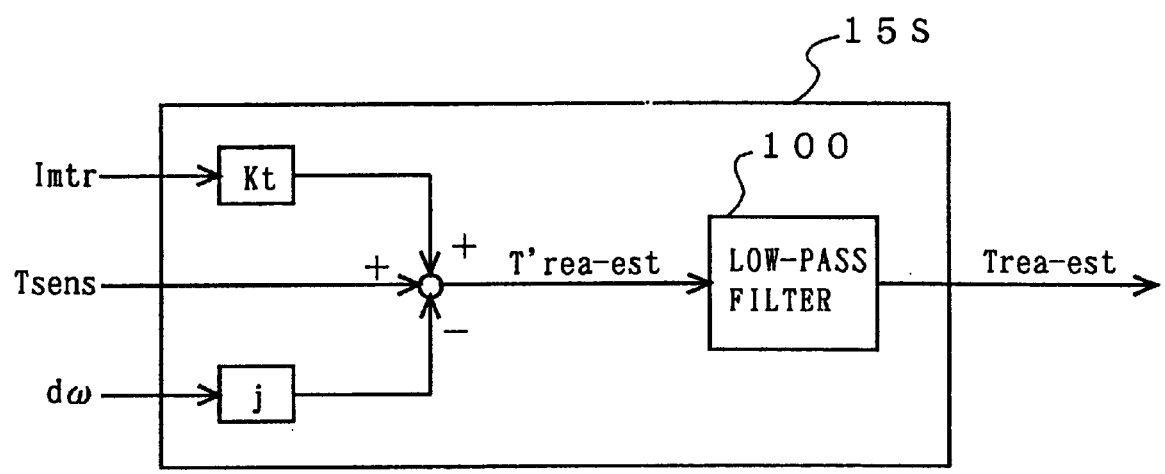
FIG. 12 is a block diagram to explain the computing operation of the road surface reaction torque detector shown in the block diagram of FIG. 10.

The rest of the operation is the same as the system of FIG. 12.

As described in the foregoing explanation of the system of FIG. 12, the inertia term (J·f²) increases its influence in proportion to square of the frequency f, while the inertia term increases its influence in proportion to the frequency as shown in Equation (5) because the low-pass filter shown in FIG. 12 is a primary filter. On the other hand, in this embodiment, the primary filter is arranged into two stages, and consequently, the influence of the inertia term does not depend on the frequency as shown in the following Equation (8):

$$J \cdot f^2/(T1 \cdot f+1)/(T2 \cdot f+1) \div J/(T1 \cdot T2) \qquad (8)$$

At this time, the primary low-pass filter of FIG. 12 aims to obtain a compensation effect of the friction term, and therefore it is necessary to avoid that arranging the filter into two stages loses the compensation effect of the friction term.

Accordingly, the time constant of the filter 100 in the first stage is established to be in the range of 0.05 Hz to 1 Hz in the same manner as that in the filter of FIG. 12, and the time constant of the filter 101 in the second stage is established to be in the range of 1.0 to 3.0 Hz in which the motor inertia term begins to increase its influence, whereby it becomes possible to obtain both friction compensation effect and prevention of increase in estimated error of road surface reaction torque at a high frequency.

The primary filter is arranged into two stages in FIG. 3, and it is also preferable that the primary filter is arranged into any other plural stages as a matter of course.

As described above, by connecting the primary low-pass filters of a plurality of stages in series, it becomes possible to accurately detect the road surface reaction force at all times, and consequently, it becomes possible to provide a power steering system in which even when conducting a high frequency manipulation, the steering wheel return torque does not unnaturally act to make the steering wheel heavy.

Embodiment 2

Figure 4:
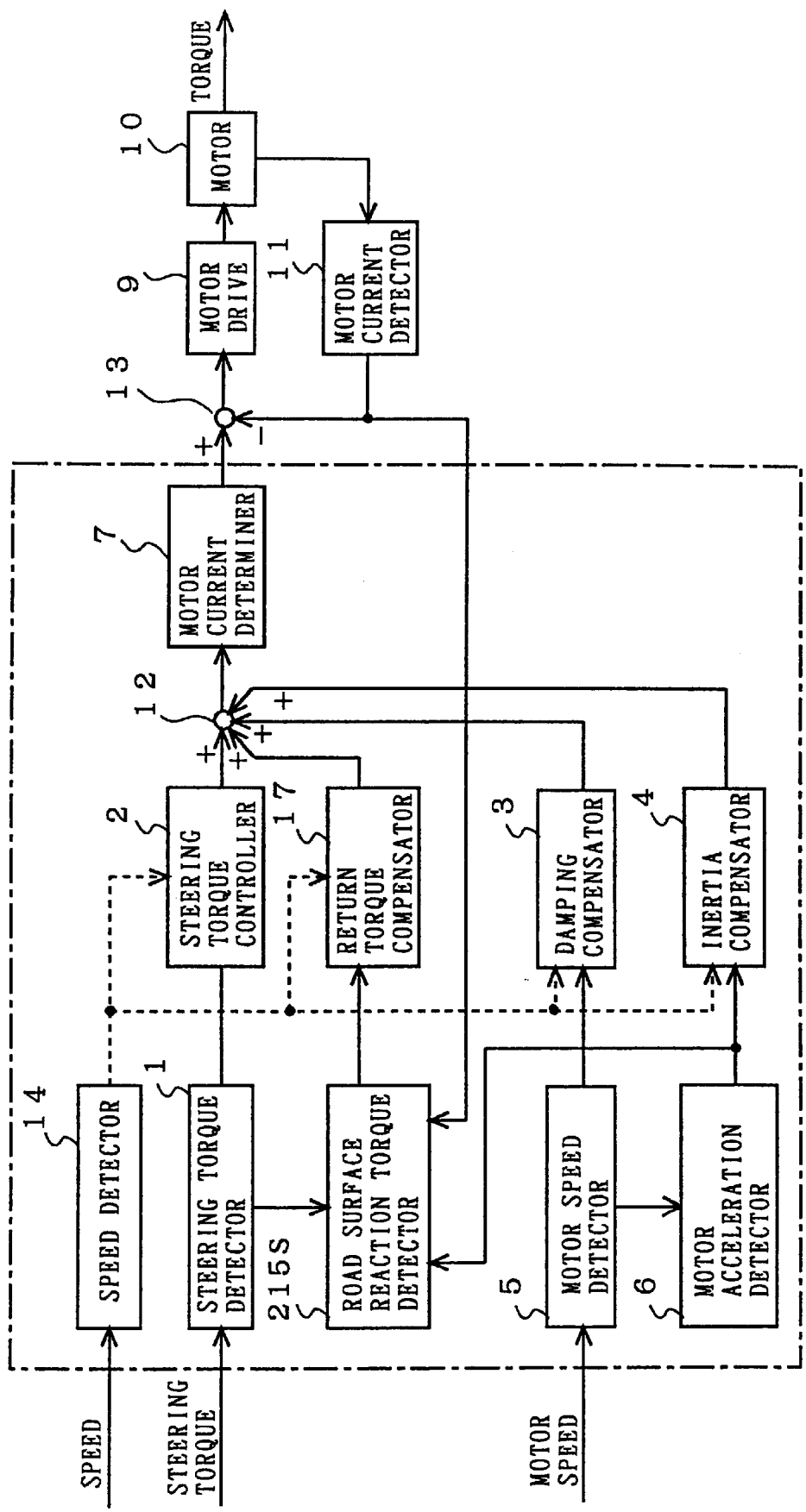
FIG. 4 is a block diagram showing an electric power steering control system according to Embodiment 2.
Figure 5:
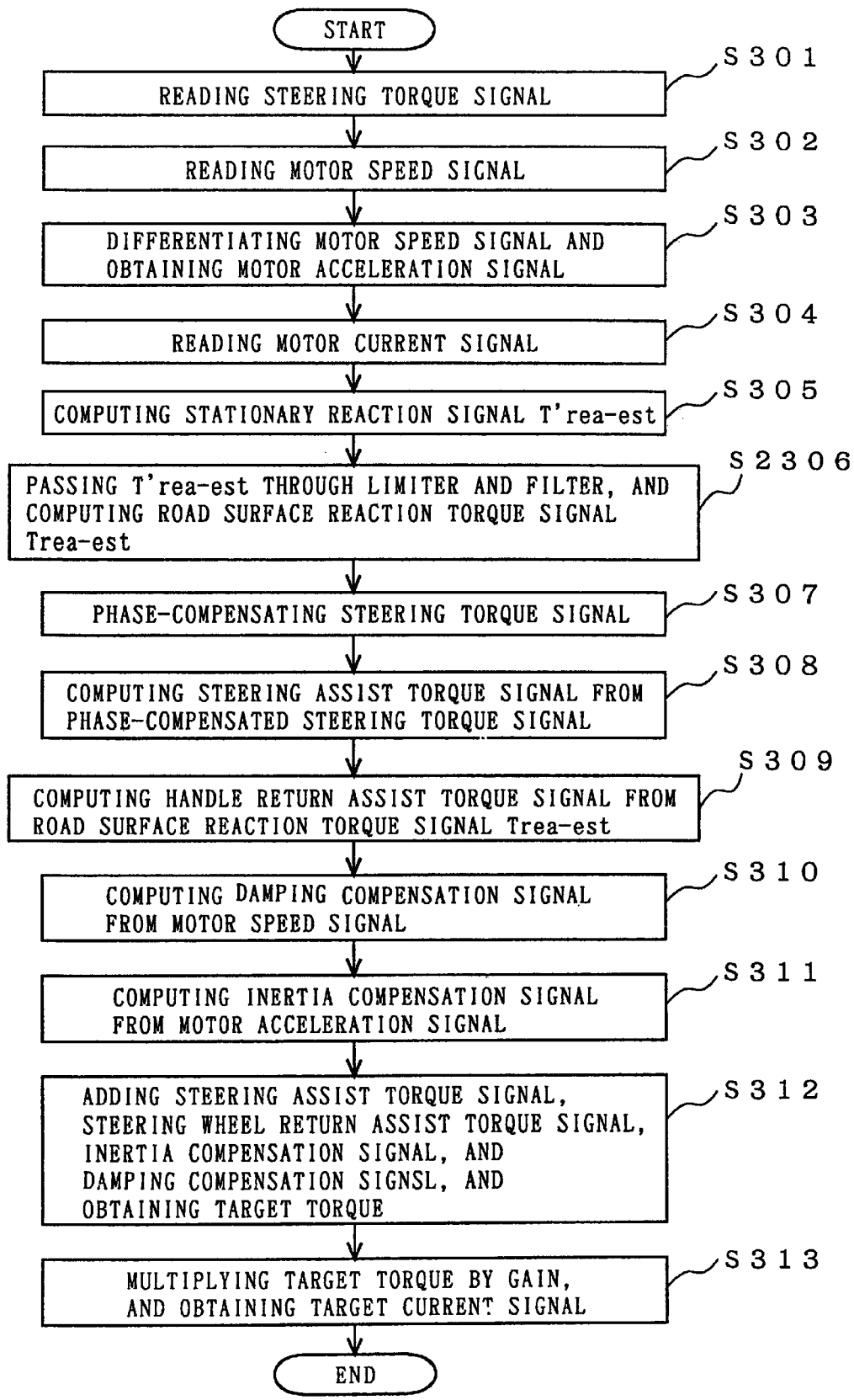
FIG. 5 is a flowchart showing the operation of a road surface reaction torque detector shown in the block diagram of FIG. 4.

FIG. 4 is a block diagram showing an electric power steering control system according to Embodiment 2 and FIG. 5 is a flowchart showing the operation of a road surface reaction torque.

Figure 6:
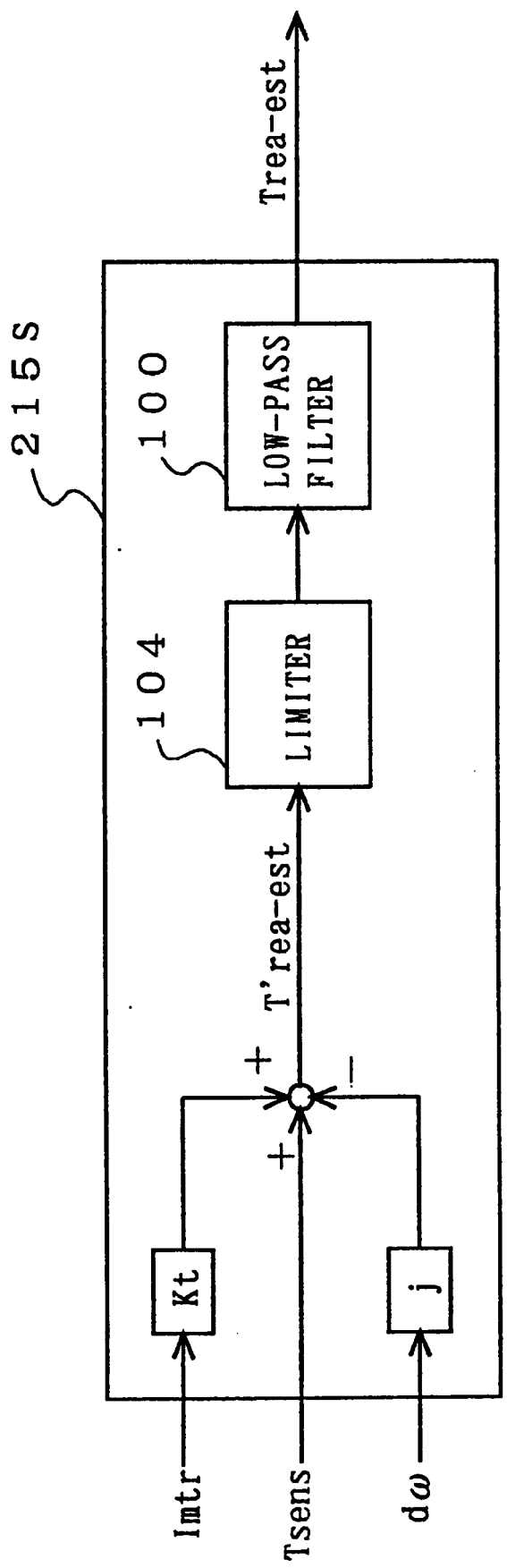
FIG. 6 is a block diagram to explain the computing operation of the road surface reaction torque detector shown in the block diagram of FIG. 4.

In FIG. 4, 215S shows a fourth road surface reaction torque detector (hereinafter referred to as fourth road surface reaction torque detecting means), and in the flowchart FIG. 5, the flow Step S306 in the conventional view is changed to S2306. FIG. 6 is a block diagram to explain the computing operation of this road surface reaction torque detector 215S.

In Embodiment 2, in S2306, T'rea-est is passed through a limiter 104 and the primary low-pass filter 100 to compute the road surface reaction torque signal Trea-est as shown in FIG. 6.

At this time, the limiter 104 limits the estimation error (T'rea-est) in the road surface reaction torque before passing through the low-pass filter 100 to be within a predetermined range in order to prevent the estimation error in the estimated value (Trea-est) of the road surface reaction torque due to the motor inertia term from unusually increasing in proportion to the frequency. The low-pass filter 100 is the same primary filter as that is shown in FIG. 12. The rest of the operation is the same as that of FIG. 12.

T'rea-est is passed through the primary low-pass filter 100 after passing through the limiter 104, and consequently, the estimated value (Trea-est) of the road surface reaction torque does not sharply increase to a large value, and the road surface reaction force is detected without large error. As a result, it is possible to provide a power steering system in which at the time of conducting a steering wheel return control on the basis of this estimated value of the road surface reaction force, even when it is a steering containing high frequency components, the steering wheel return torque does not unusually act to make the steering wheel heavy.

In Embodiment 2, the low-pass filter 100 is the same primary filter that is used in FIG. 12, but is not limited to this primary filter. It is also preferable to use a plurality of low-pass filters connected in series in the same manner as in Embodiment 1 for the purpose of detecting the road surface reaction force more accurately.

Embodiment 3

Figure 7:
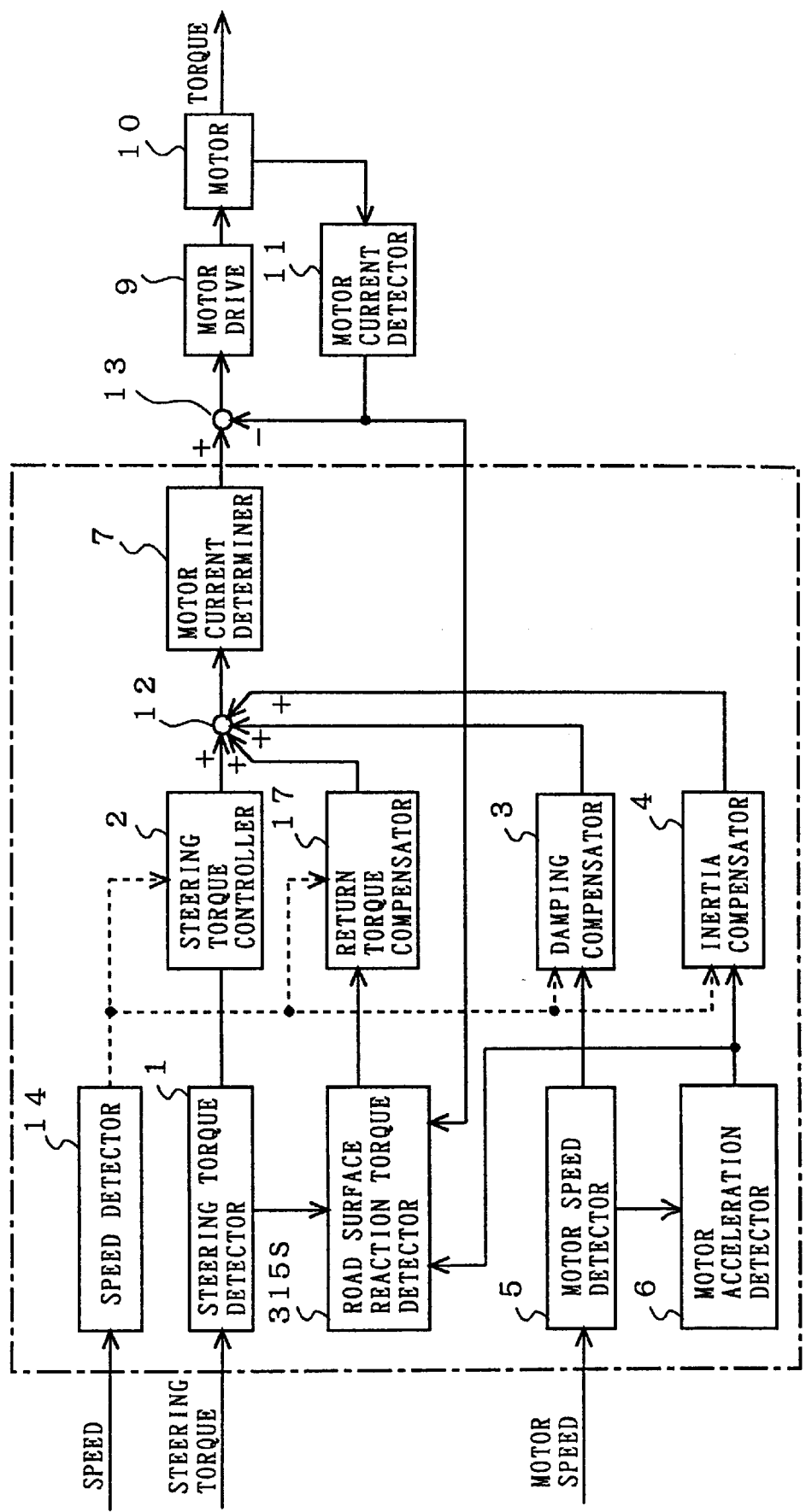
FIG. 7 is a block diagram showing an electric power steering control system according to Embodiment 3.
Figure 8:
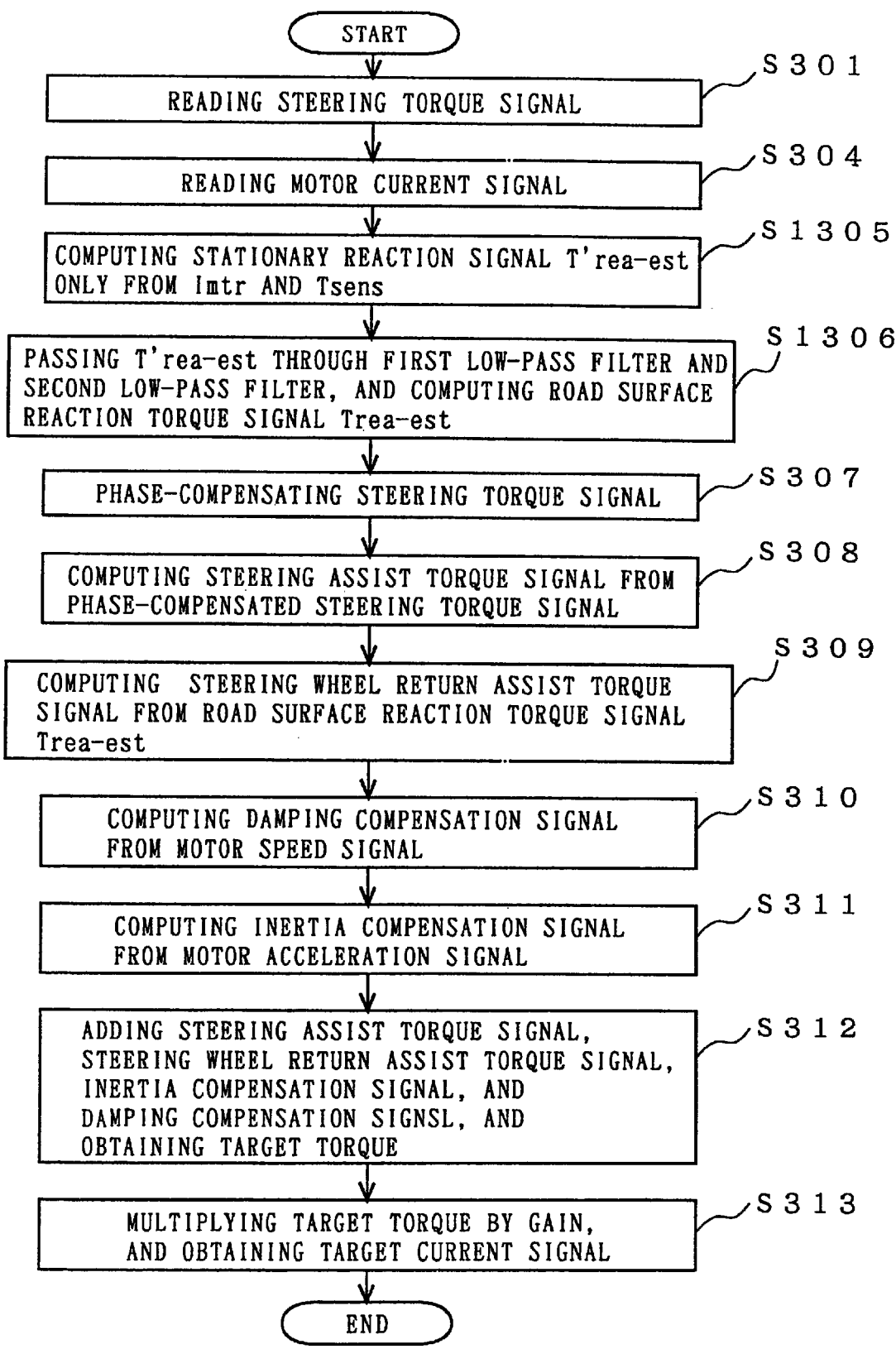
FIG. 8 is a flowchart showing the operation of a road surface reaction torque detector shown in the block diagram of FIG. 7.

FIG. 7 is a block diagram showing an electric power steering control system according to Embodiment 3, and FIG. 8 is a flowchart showing the operation of a road surface reaction torque detector shown in the block diagram of FIG. 7.

In FIG. 7, 315S shows a first road surface reaction torque detector (which is referred to as first means for detecting road surface reaction torque). Note that the signal sent from the output side of the motor acceleration detector 6 to the second road surface reaction torque detector 115S is not described in FIG. 7. Steps S302 to S303 in FIG. 2 do not exist in FIG. 8, and S305 and S306 in FIG. 2 are changed to S1305 and S1306 respectively.

Figure 9:
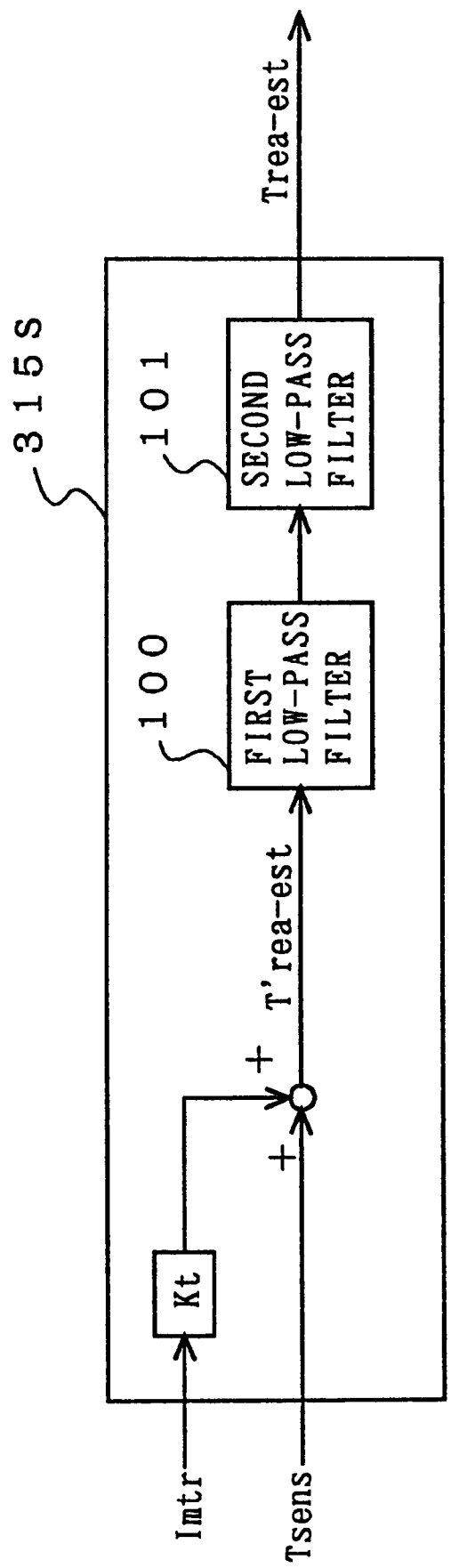
FIG. 9 is a block diagram to explain the computing operation of the road surface reaction torque detector shown in the block diagram of FIG. 7.
Figure 10:
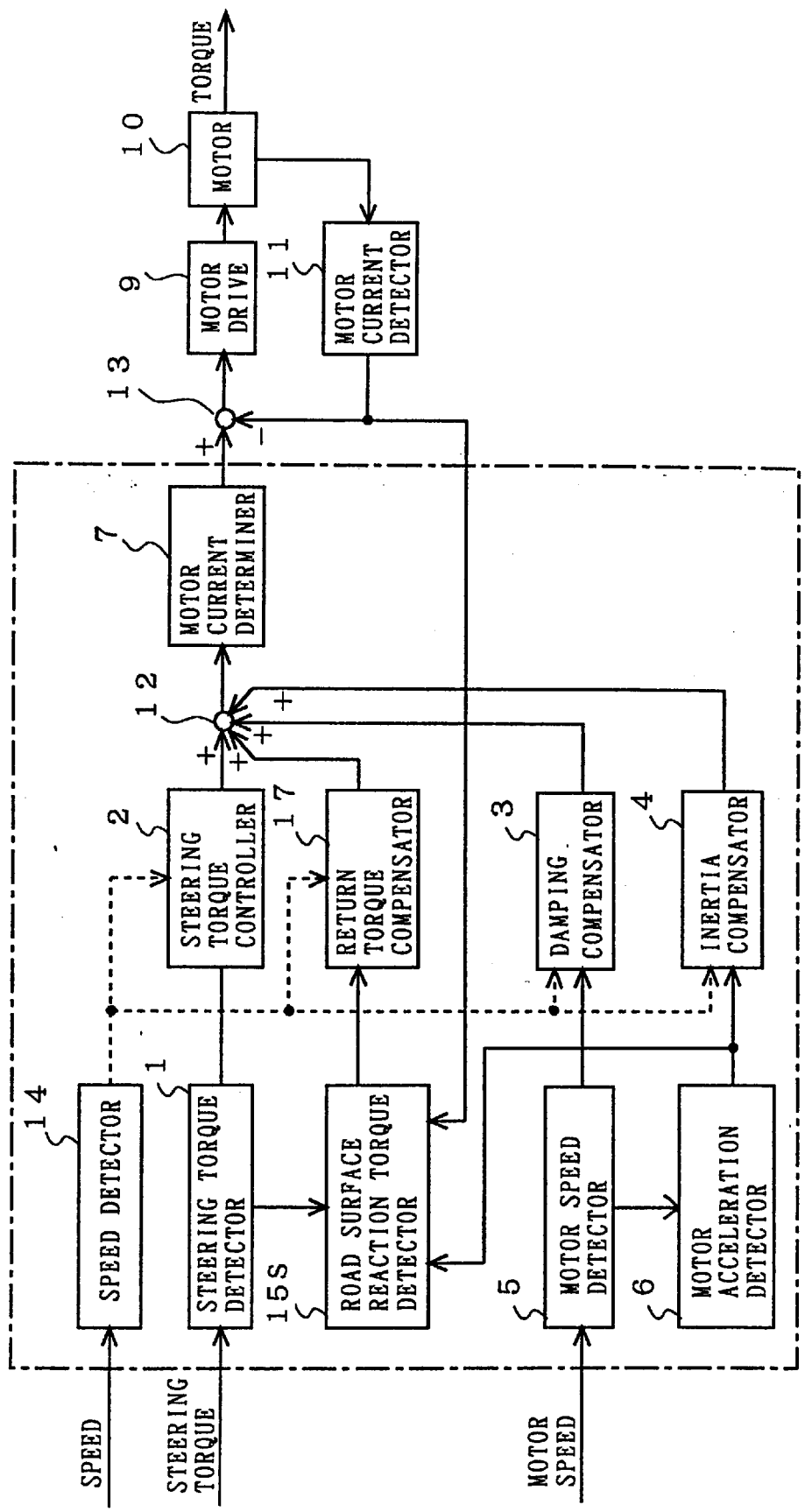
FIG. 10 is a block diagram showing an electric power steering control system.

FIG. 9 is a block diagram to explain the computing operation of the road surface reaction torque detector 315S. In this Embodiment 3, in computing the stationary reaction force signal T'rea-est in S1305, as shown in FIG. 9, only the steering torque signal Tsens and the motor current signal Imtr are used to obtain the stationary reaction force signal T'rea-est from the following Equation (9).

$$T'rea\text{-}est = Tsens + Kt \cdot Imtr \tag{9}$$

Kt: a torque constant of the motor (computed in terms of steering shaft)

Next, in S1306, in the same manner as in S1306 in the foregoing Embodiment 1, the foregoing T'rea-est is passed through the low-pass filters composed of the first low-pass filter 100 and the second low-pass filter 101 connected in series to compute the road surface reaction torque Trea-est. The rest of the operation is the same as the system of FIG. 12.

In Embodiment 3, the inertia term of the motor is not considered in computing the road surface reaction torque, but there is no large influence due to ignoring the inertia term of the motor because the filter is arranged into two stages. In this Embodiment 3, construction of the circuit becomes simple, and it is possible to provide an inexpensive electric power steering control system.

In Embodiment 3, in the same manner as S1306 in Embodiment 1, the foregoing T'rea-est is passed through the two low-pass filters connected in series to compute the road surface reaction torque Trea-est, but the invention is not limited to this. It is also preferable to pass T'rea-est through the limiter and the low-pass filter in the same manner as S2306 in Embodiment 2 to compute the road surface reaction torque signal Trea-est. The road surface reaction torque detector constructed as described above is referred to as a third road surface reaction torque detector (third means for detecting road surface reaction torque). It is also preferable that the low-pass filters are composed of a plurality of low-pass filters connected in series to detect the road surface reaction force more accurately.

In this embodiment, the inertia term of the motor is not considered, and for example, it is also preferable that the inertia term of the motor and the current term (Kt·Imtr) are not considered when the road surface reaction torque detection value is utilized under the steering condition that only a very small amount of current flows.

In a system provided with an electromotor and a machine satisfying the condition that the steering torque is approximately in proportion to the electric current, the invention is effective even if only the current term is considered, as a matter of course.

What is claimed is:

1. An electric power steering control system comprising:
   an electric motor which generates a torque for assisting steering torque generated by steering wheel manipulation;

steering torque detecting means for detecting the steering torque;

motor current detecting means for detecting a motor current flowing in said electric motor; and road surface reaction torque detecting means for obtaining a road surface reaction torque detection value by passing a value, obtained by adding the steering torque and a motor torque computed from the motor current, through plural stages of low-pass filters connected in series.

2. An electric power steering control system comprising:

an electric motor which generates a torque for assisting steering torque;

steering torque detecting means for detecting the steering torque;

motor current detecting means for detecting a motor current flowing in said electric motor;

rotational acceleration detecting means for detecting rotational acceleration of said electric motor; and road surface reaction torque detecting means for obtaining a road surface reaction torque detection value by passing a first value, obtained by subtracting a motor inertia torque, computed from the rotational acceleration, from a second value, obtained by adding the steering torque and a motor torque computed from the motor current, through plural stages of low-pass filters connected in series.

3. The electric power steering control system according to claim 2, including a limiter for limiting the first value before passing the first value through the plural stages of low-pass filters, thereby limiting error in the road surface reaction torque obtained from the first value.

4. The electric power steering control system according to claim 1, wherein the plural stages of low-pass filters include at least one filter having a time constant corresponding to a cutoff frequency not less than 0.05 Hz and not more than 1 Hz and at least one filter having a time constant corresponding to a cutoff frequency not less than 1 Hz and not more than 3 Hz.

5. The electric power steering control system according to claim 3, wherein the plural stages of low-pass filters include at least one filter having a time constant corresponding to a cutoff frequency not less than 0.05 Hz and not more than 1 Hz and at least one filter having a time constant corresponding to a cutoff frequency not less than 1 Hz and not more than 3 Hz.

6. An electric power steering control system comprising:

an electric motor which generates a torque for assisting steering torque;

steering torque detecting means for detecting the steering torque;

motor current detecting means for detecting a motor current flowing in said electric motor;

a limiter for limiting a value obtained by adding the steering torque and a motor torque computed from the motor current, thereby limiting error in the value used to obtain a road surface reaction torque value; and road surface torque detecting means for obtaining the road surface reaction torque value by passing the value, after passing through the limiter, through a low-pass filter connected to the limiter.

7. An electric power steering control system comprising:

an electric motor which generates a torque for assisting steering torque;

steering torque detecting means for detecting the steering torque;

motor current detecting means for detecting a motor current flowing in said electric motor;

rotational acceleration detecting means for detecting a rotational acceleration of said electric motor;

a limiter for limiting a first value, obtained by subtracting a motor inertia torque, computed from the rotational acceleration, from a second value, obtained by adding the steering torque and the motor torque of said electric motor computed in terms of the motor current, thereby limiting error in the first value from which a road surface reaction torque value is obtained; and road surface reaction torque detecting means for obtaining the road surface reaction torque detection value by passing the first value, after passing through the limiter, through a low-pass filter connected to the limiter.

8. A method for controlling an electric power steering control system comprising:

detecting a steering torque generated by steering wheel manipulation;

detecting a current of an electric motor which generates a torque for assisting the steering torque;

detecting a rotational acceleration of said electric motor; and detecting a road surface reaction torque for obtaining a road surface reaction torque detection value by passing a first value, obtained by subtracting motor inertia torque, computed from the rotational acceleration, from a second value, obtained by adding the steering torque and a motor torque, computed from the motor current, through plural stages of low-pass filters connected in series.

9. A method for controlling an electric power steering control system comprising:

detecting a steering torque generated by steering wheel manipulation;

detecting a current of an electric motor which generates a torque for assisting the steering torque;

detecting a rotational acceleration of said electric motor;

limiting a first value, obtained by subtracting a motor inertia torque, computed from the rotational acceleration, from a second value, obtained by adding the steering torque and a motor torque, computed from the motor current, thereby limiting error in the first value which is used to obtain a road surface reaction torque value; and detecting a road surface reaction torque for obtaining a road surface reaction torque detection value by passing the first value, after limiting, through a low-pass filter receiving the first value.

10. The electric power steering control system according to claim 1, including a limiter for limiting the value before passing the value through the plural stages of low-pass filters, thereby limiting error in the road surface reaction torque.

* * * * *